(12) United States Patent
Colas

(10) Patent No.: US 9,285,608 B2
(45) Date of Patent: Mar. 15, 2016

(54) METHOD FOR DETERMINING FRONT AND REAR SURFACES FOR OPTICAL PATCHES

(75) Inventor: Pauline Colas, Charenton le Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 65 days.

(21) Appl. No.: 14/343,159

(22) PCT Filed: Sep. 6, 2011

(86) PCT No.: PCT/IB2011/002456
§ 371 (c)(1),
(2), (4) Date: Mar. 6, 2014

(87) PCT Pub. No.: WO2013/034949
PCT Pub. Date: Mar. 14, 2013

(65) Prior Publication Data
US 2014/0211152 A1  Jul. 31, 2014

(51) Int. Cl.
*G02C 7/08* (2006.01)
*G02C 7/02* (2006.01)

(52) U.S. Cl.
CPC *G02C 7/024* (2013.01); *G02C 7/02* (2013.01); *G02C 7/08* (2013.01); *G02C 7/086* (2013.01); *G02C 7/088* (2013.01); *G02C 2200/20* (2013.01); *G02C 2202/08* (2013.01); *G02C 2202/20* (2013.01)

(58) Field of Classification Search
CPC ........ G02C 7/024; G02C 7/027; G02C 7/086; G02C 7/088; G02C 2200/20; G02C 2202/20

USPC ............. 351/159.44, 159.46, 159.47, 159.73, 351/159.74, 159.75, 159.76
See application file for complete search history.

(56) References Cited

U.S. PATENT DOCUMENTS

| | | | |
|---|---|---|---|
| 3,628,854 A * | 12/1971 | Jampolsky | ............... 351/159.58 |
| 4,547,049 A | 10/1985 | Cotie | |
| 5,187,505 A | 2/1993 | Spector | |
| 2010/0007846 A1 | 1/2010 | Fermigier et al. | |
| 2010/0259717 A1 | 10/2010 | Fermigier et al. | |

FOREIGN PATENT DOCUMENTS

| | | |
|---|---|---|
| EP | 2 028 527 A1 | 2/2009 |
| WO | 2007/141440 A1 | 12/2007 |
| WO | 2009/080940 A1 | 7/2009 |

OTHER PUBLICATIONS

International Search Report, dated May 9, 2013, from corresponding PCT application.

* cited by examiner

*Primary Examiner* — Darryl J Collins
(74) *Attorney, Agent, or Firm* — Young & Thompson

(57) ABSTRACT

Optical patches are assigned to prescriptions so as to reduce the total number of patch surfaces which are involved. The prescriptions are produced by varying at least one of a front patch surface (S1) and rear patch surface (S2) which are combined to form an optical patch, in accordance with prescription segments. The front patch surfaces (S1) are pseudo-spherical and the rear patch surfaces (S2) include a Fresnel structure superimposed on a pseudo-spherical base shape.

19 Claims, 4 Drawing Sheets

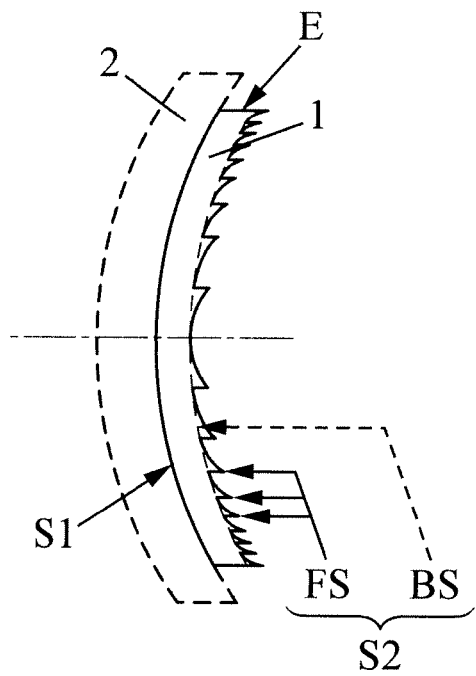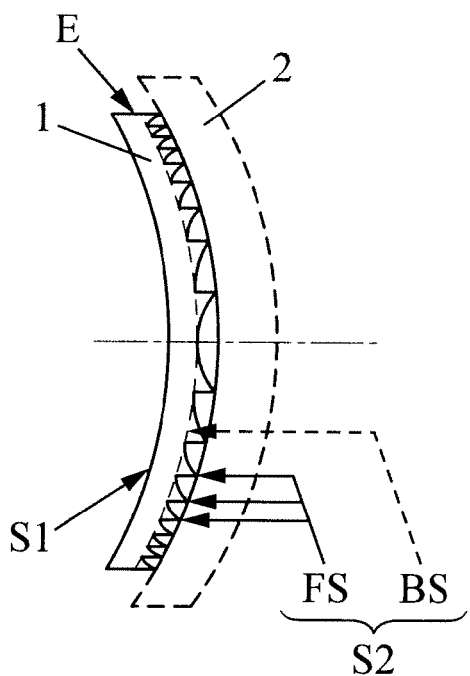
FIG. 1a          FIG. 1b
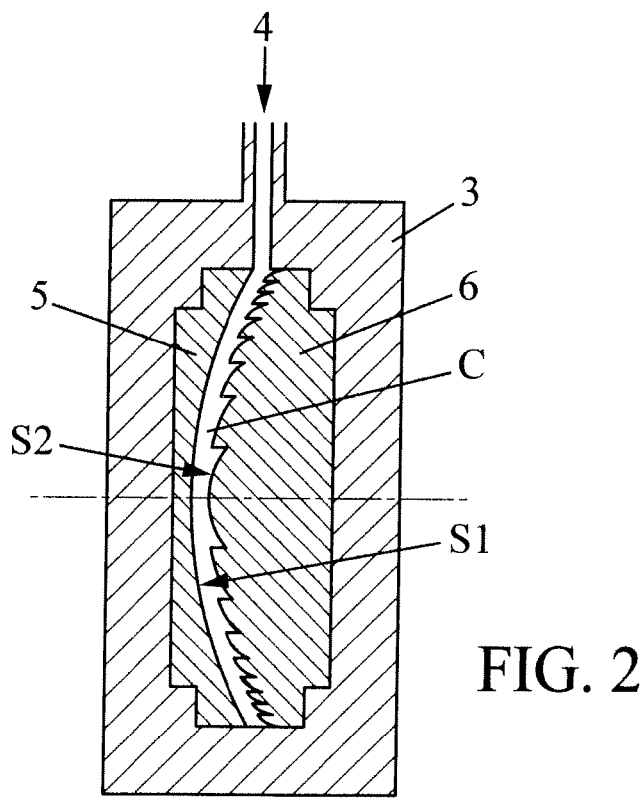
FIG. 2

| OPTICAL POWER (diopter) | 0.00 | 0.25 | 0.50 | 0.75 | 1.00 | ASTIGMATISM (diopter) |
|---|---|---|---|---|---|---|
| 4.00 | | SG13 | SG13 | | | } SG5 |
| 3.75 | | | | | | |
| 3.50 | | | | | | |
| 3.25 | REF | | | | | |
| 3.00 | | | | | | } SG4 |
| 2.75 | | | | | | |
| 2.50 | REF | | | | 13    3 | |
| 2.25 | | | 7    3 | 10    3 | 14    3 | } SG3 |
| 2.00 | 2    3 | 4    3 | 8    3 | 11    3 | 15    3 | |
| 1.75 | 1 REF 3 | 5    3 | 9    3 | 12    3 | 13    2 | |
| 1.50 | 3    3 | 6    3 | 7    2 | 10    2 | 14    2 | } SG2 |
| 1.25 | 2    2 | 4    2 | 8    2 | 11    2 | 15    2 | |
| 1.00 | 1 REF 2 | 5    2 | 9    2 | 12    2 | 13    1 | |
| 0.75 | 3    2 | 6    2 | 7    1 | 10    1 | 14    1 | } SG1 |
| 0.50 | 2    1 | 4    1 | 8    1 | 11    1 | 15    1 | |
| 0.25 | 1 START 1 | 5    1 | 9    1 | 12    1 | | } SG6 |
| 0.00 | 3    1 | 6    1 | | | | |
| -0.25 | REF | | | | | |
| -0.50 | | | | | | } SG7 |
| -0.75 | | | | | | |
| -1.00 | REF | | | | | |
| -1.25 | | | | | | } SG8 |
| -1.50 | | | | | | |
| -1.75 | REF | | | | | |
| -2.00 | | | | | | } SG9 |
| -2.25 | | | | | | |
| -2.50 | REF | | | | | |
| -2.75 | | | | | | } SG10 |
| -3.00 | | | | | | |
| -3.25 | REF | | | | | |
| -3.50 | | | | | | } SG11 |
| -3.75 | | | | | | |
| -4.00 | REF | | | | SG12 | |

FIG. 3b

METHOD FOR DETERMINING FRONT AND REAR SURFACES FOR OPTICAL PATCHES

TECHNICAL FIELD

The present invention relates to determining front and rear surfaces for optical patches.

Optical patches are known ophthalmic elements which are intended to be combined with spectacle eyeglasses for providing optical power to a wearer of these spectacles. An important application for optical patches is that of sunglasses which are manufactured so that these sunglasses provide antisolar protection but without compensating initially for a wearer's ametropia. Combining each eyeglass of a pair of sunglasses with an appropriate optical patch allows combining antisolar protection with ametropia correction, so that the wearer has sharp vision through the pair of sunglasses. Another application of optical patches is to provide additional optical power and/or astigmatism to ametropia-correcting base spectacle eyeglasses, so that the combination of one optical patch with one base eyeglass produces a total optical power and astigmatism which match the wearer's ametropia. For example, the base eyeglass may be of progressive type for a presbyopic wearer, and the optical patch may be selected so that the base eyeglass combined with the optical patch produces a far vision correction which matches the far vision power value prescribed for the wearer.

To this end, an optical patch is a member of light-refracting material with front and rear surfaces which are designed so that the patch acts as a lens for producing optical power and possibly astigmatism. In addition, one of these surfaces is convex, so that the optical patch can be applied onto the posterior surface of a base spectacle eyeglass: the convex surface of the optical patch is facing the posterior concave surface of the base eyeglass.

But for aesthetic matters in particular, the thickness of an optical patch may be limited. Then, one of the surfaces of each optical patch has a Fresnel structure suitable for producing the desired optical power. Such optical patches are known in particular from WO 2007/141440 and WO 2009/080940. In the description below, the patch surface with the Fresnel structure will be called rear surface of the optical patch.

BACKGROUND OF THE INVENTION

Optical patches are usually manufactured using casting, injection or embossing processes. When implementing these processes, two mould inserts corresponding respectively to the front surface and the rear surface desired for the optical patch are placed in a mould or an embossing device. In the context of the present specification, the phrase "mould insert" encompasses a casting insert, an injection insert, as well as an embossing insert. The optical patches produced in this way reproduce the insert surfaces. The issue is then to supply the mould inserts necessary for all the optical patches to be manufactured. But manufacturing a mould insert itself is costly, in particular for those of the mould inserts which have the Fresnel structure.

In addition, optical patches corresponding to all possible ophthalmic prescriptions need to be available, for satisfying all the needs that may occur with a great number of wearers. Typically, the ophthalmic prescriptions may correspond to values for the optical power from −4 diopters to +4 diopters with 0.25 diopter increment. Simultaneously, the prescribed astigmatism values may be from 0 to 1.0 diopter with increment of 0.25 diopter. This leads to a total number of 33×5, i.e. 165 possible prescription combinations. Then, supposing that all optical patches have one and same front surface, and that the rear surface alone produces the varying optical power and astigmatism values, then a total number of 166 mould inserts are necessary: one single front mould insert and 165 rear mould inserts. Such number of mould inserts is huge and very expensive as a consequence.

Then, an object of the invention consists in determining front and rear surfaces for a set of optical patches, so that every ophthalmic prescription can be satisfied with a limited total number of mould inserts.

SUMMARY OF THE INVENTION

To meet this object and others, the invention proposes a method for determining a set of front patch surfaces and a set of rear patch surfaces for a series of optical patches each obtained by combining one of the front patch surfaces with one of the rear patch surfaces. Each front patch surface is of pseudo-spherical shape, and each rear patch surface is comprised of a Fresnel structure which is superimposed on a pseudo-spherical base shape. In addition, the series of optical patches contains at least one optical patch respectively for prescriptions which are each obtained by combining one optical power value out of a set of optical power values with one astigmatism value out of a set of astigmatism values. The invention method comprises the following steps:

/1/ providing at least one specification condition for the optical patches;

/2/ for a start-prescription, determining one first rear patch surface and one first front patch surface so that an optical patch obtained by combining these first rear patch surface and first front patch surface meets the specification condition;

/3/ for each prescription within a prescription start-segment containing the start-prescription, and other than this latter, calculating a secondary front patch surface so that an optical test patch obtained by combining the first rear patch surface with the secondary front patch surface corresponds to the prescription;

/4/ selecting a primary prescription sub-segment within the prescription start-segment, so that all optical test patches which are obtained in step /3/ and correspond to prescriptions within this primary prescription sub-segment meet the specification condition;

/5/ selecting a secondary prescription sub-segment within the primary prescription sub-segment, so that all prescriptions are contained in at least one prescription segment produced by a tiling based on said secondary prescription sub-segment, with each prescription segment being obtained by translating the secondary prescription sub-segment used as a tile in a plane with optical power and astigmatism coordinates;

/6/ for each prescription segment produced by this tiling, and for the prescription which is at a location with respect to this prescription segment similar to that of the start-prescription within the secondary prescription sub-segment, determining a secondary rear patch surface with Fresnel structure so that another optical patch obtained by combining this secondary rear patch surface with the first front patch surface corresponds to the prescription; and /7/ assigning a rear patch surface and a front patch surface to each prescription in the following manner:

/7a/ for the start-prescription: the first rear patch surface and the first front patch surface determined in step /2/;

/7b/ when the prescription is within the secondary prescription sub-segment, and other than the start-prescription: the first rear patch surface determined in step /2/; and the secondary front patch surface calculated in step /3/ for this prescription;

/7c/ when the prescription is within a prescription segment produced by the tiling other than the secondary prescription sub-segment:

the secondary rear patch surface determined in step /6/ for the prescription segment of concern; and the same front patch surface as that assigned in sub-step /7a/ or /7b/ for the prescription within the second prescription sub-segment at the location similar to that of the current prescription with respect to the prescription segment.

Thus, according to the invention, one and same rear patch surface is used for all the prescriptions within one prescription segment. Simultaneously, a same set of front patch surfaces is used for all the prescription segments. This leads to a total number of patch surfaces, front surfaces plus rear surfaces, which is equal to about the sum of the number of prescription segments plus the number of prescriptions within each segment. This total number is thus greatly reduced thanks to the invention.

The invention method may further comprise the following step:

/8/ producing mould inserts with respective insert surfaces which correspond to one of the rear patch surfaces or front patch surfaces as assigned to at least one prescription in step /7/.

In preferred implementations of the invention, one or several of the improvements now listed may be used, separately or by combining some of them:

the start-prescription may comprise a first one of the optical power values and zero-astigmatism value, and the Fresnel structure of the first rear patch surface may be selected so as to produce itself this first optical power value, and one and same shape may be used for both the pseudo-spherical base shape of the first rear patch surface and the first front patch surface;

the specification condition provided in step /1/ may comprise at least one of a thickness of less than a first limit for an optical patch at a center point in this optical patch, a maximum thickness of less than a second limit along a peripheral edge of the optical patch, an optical-type condition for the optical patch, and a minimum number of prescriptions for which an aspherization of the rear patch surface is correct;

the shape of each front patch surface may be either spherical or toric;

the pseudo-spherical base shape of each rear patch surface may be either spherical or toric, but preferably spherical;

the optical power values of the optical power value set may have a constant increment of 0.25 diopter;

the astigmatism values of the astigmatism value set may have a constant increment of 0.25 diopter;

the secondary prescription sub-segment which is used as a tile may contain less than twenty prescriptions different from each other; and the set of optical power values may contain at least twenty-five power values, and the set of astigmatism values may contain at least four values, and the method may lead to less than fifteen rear patch surfaces different from each other, and less that twenty front patch surfaces different from each other.

BRIEF DESCRIPTION OF THE DRAWINGS

Other details and advantages of the invention will appear from the description hereafter of non-limiting implementation examples, in connection with the following figures:

FIGS. 1a and 1b are cross-sectional views of optical patches which may be obtained by implementing a method according to the invention.

FIG. 2 is a cross-sectional view of a mould used for manufacturing an optical patch with surfaces determined according to the invention.

FIGS. 3a and 3b reproduce a two-dimensional prescription display for illustrating some steps of a method according to the invention.

DETAILED DESCRIPTION OF PREFERRED EMBODIMENTS

Figure 3A:
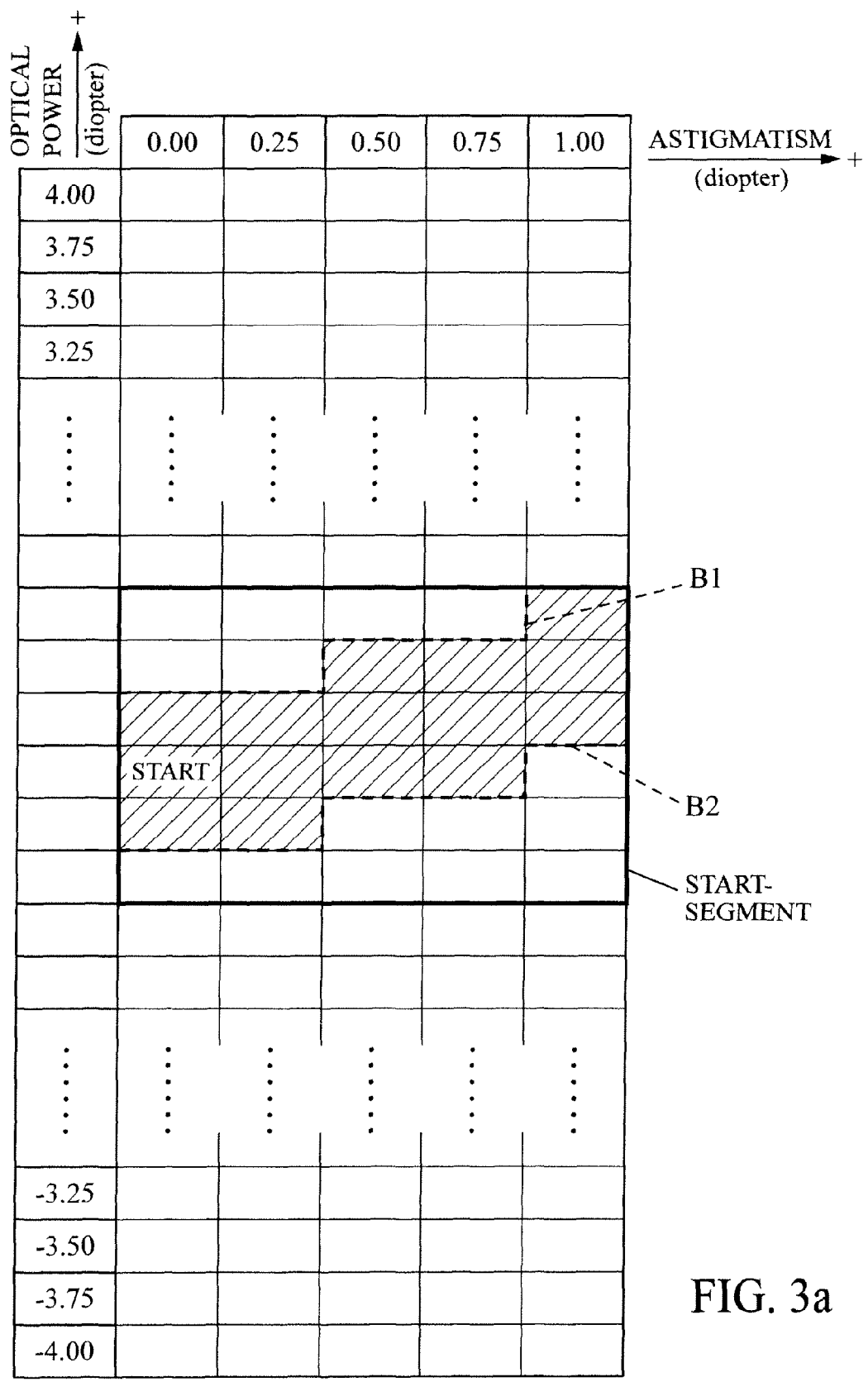

For sake of clarity, elements which are represented in FIGS. 1a, 1b and 2 are not sized in relation with actual dimensions or dimension ratios. In addition, all the values which are indicated in FIGS. 3a and 3b and the present description are for illustrative purpose only, and may be varied depending on the actual implementations of the invention.

Referring to FIG. 1a or 1b, an optical patch is comprised of a portion 1 of transparent material, which is limited between a front surface S1 and a rear surface S2. A peripheral edge E connects the front surface S1 and the rear surface S2 out of portions of these latter which are useful optically. The front surface S1 is pseudo-spherical. In the context of the present invention, a pseudo-spherical surface or shape is a continuous surface with curvature values existing at each point in this surface. These curvature values may vary between two points contained in the surface. In particular, aspherical, progressive and regressive surfaces are pseudo-spherical with varying curvature values. But curvature values may also be constant over a pseudo-spherical surface. When two constant curvature values which are different from each other exist over the whole surface, the surface is toric. When these constant curvature values are additionally equal to each other, then the surface is spherical. Therefore, toric and spherical surface portions are special pseudo-spherical surfaces.

The rear surface S2 is obtained by superimposing a Fresnel structure FS on another pseudo-spherical shape denoted BS and called base shape. In a known manner, a Fresnel structure is comprised of a series of optical surface portions which are ring-shaped and nested within each other, with height jumps between two successive portions. The height jumps allows keeping the thickness of the optical patch limited to small or intermediate values, for a fixed value of the optical power of the patch. The number of Fresnel surface portions may be any but higher than two, and is not important with respect to the invention. The pseudo-spherical base shape BS may be identical to that of the front surface S1 or not. If yes, then the optical power and the astigmatism of the optical patch are produced only by the Fresnel structure FS.

Generally, the shape of the front patch surface S1 and the base shape BS of the rear patch surface S2 may be any ones comprised in the definition of pseudo-spherical shapes recited just above.

For example, the transparent material used for the portion 1 may be based on polycarbonate, polyamide, polyimide, polysulfone, copolymer of polyethyleneterephtalate and polycarbonate, polyolefine, in particular polynorbornene, polymer or copolymer of diethyleneglycol bis-allylcarbonate, polymer or copolymer of (meth)acrylic, in particular (meth)acrylic polymers or copolymers derived from bisphenol-A, polymers or copolymers of thio(meth)acrylic, polymers or copolymers of urethane and thiourethane, polymers or copolymers of epoxy, or polymers or copolymers of episulfide. Such material used for the portion 1 is resilient enough so that the front patch surface S1 or the rear patch surface S2 can conform to the shape of the posterior surface of an ophthalmic element.

According to FIG. 1a, the front patch surface S1 may be convex so that the optical patch is adapted for being applied onto the posterior surface of an ophthalmic element 2. Such ophthalmic element 2 is represented in broken line and may be a spectacle eyeglass. The posterior surface of the element 2 is that one which faces a wearer's eye in use position, and is concave. Thus, the front patch surface S1 of the optical patch is facing the posterior surface of the ophthalmic element 2.

FIG. 1b illustrates the opposite case where the rear patch surface S2 of the optical patch is facing the posterior surface of the ophthalmic element 2.

In such other case, the pseudo-spherical base shape BS of the rear patch surface S2 is convex.

For convenience only, the description is now continued for optical patches all with the cross-sectional profile of FIG. 1a, but the invention may be applied identically with the other profile of FIG. 1b.

The optical patches to which the invention applies may be manufactured using an injection or casting process, depending on the material of portion 1. In both cases, a mould 3 with cross-section as represented in FIG. 2 may used, with an internal cavity C. This cavity C is provided with a material inlet 4, together with an opening system (not shown) suitable for recovering the moulded patch. The cavity C is also designed for accommodating a front mould insert 5 and a rear mould insert 6 with respective insert surfaces corresponding to the front patch surface S1 and rear patch surface S2. Usually, the inserts 5 and 6 are out of metal, and machined so as to be provided with the appropriate insert surfaces. Then, the patch obtained may be varied only by selecting the front mould insert 5 and the rear mould insert 6 in accordance with the optical power and astigmatism values desired for the patch. For obtaining a complete series of optical patches which comply with a set of possible prescriptions, a first series of front mould inserts 5 and a second series of rear mould inserts 6 must be used, and a patch to be obtained for one of the prescriptions results from selecting appropriately the inserts 5 and 6. One issue is then to reduce the total number of mould inserts which are necessary for the complete prescription set, because of the cost price of each insert. The invention consists in determining the insert surfaces of the mould inserts 5 and 6, so that combining the front mould inserts with the rear mould inserts leads to the complete set of prescriptions.

The complete set of ophthalmic prescriptions may be represented using a two-dimensional plane with optical power axis and astigmatism axis as reproduced in FIGS. 3a and 3b. The values for the optical power may be varied with constant increment of 0.25 diopter from −4.00 diopters to +4.00 diopters. Negative values for the optical power are intended for myopic wearers, and positive values are intended for long-sighted wearers. Astigmatism values may be varied from 0.00 diopter to 1.00 diopter, also with constant increment of 0.25 diopter. Then, each box corresponding to a pair formed by one of the optical power values and one of the astigmatism values is a possible prescription, and the table obtained displays the complete prescription set.

Figure 4:
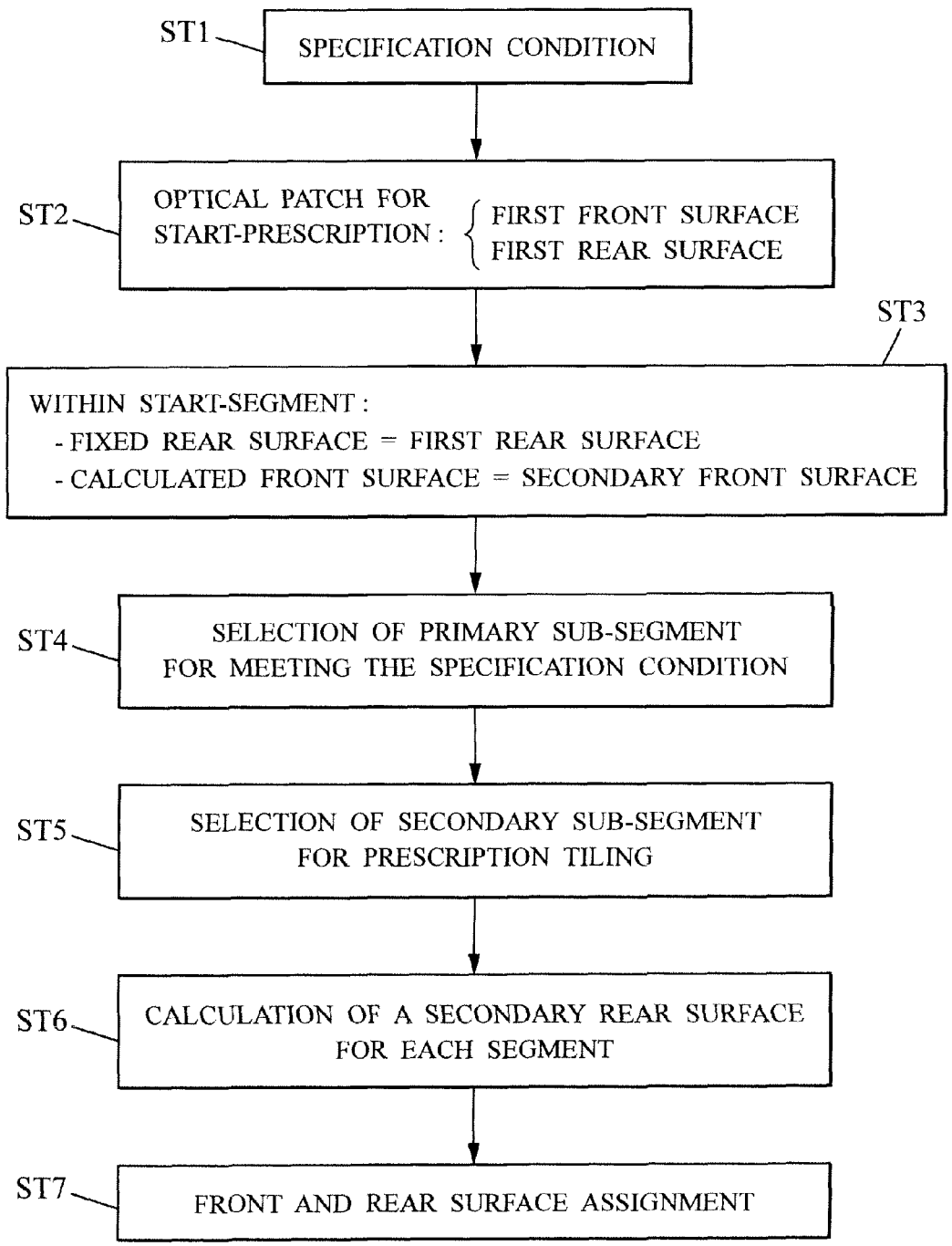
FIG. 4 is a block diagram showing the steps of a method according to the invention.

Referring now to FIG. 4, reference signs ST1 to ST7 denote successive steps of a method according to the invention.

Step ST1 consists in providing at least one specification condition to be met by each optical patch to be manufactured. Such specification condition may be of any type: geometrical condition, optical condition, manufacturability, aesthetics, etc. The condition may be simple or composite, i.e. comprised of several conditions to be met simultaneously by each optical patch. For example, the specification condition may comprise at least one of a thickness of less than 2 mm for the optical patch at a center point of this latter, and a maximum thickness of less than 3 mm for the optical patch along its peripheral edge E.

Step ST2 consists in determining a first optical patch for a start-prescription. The start-prescription may be any one in the prescription set. A first front patch surface S1 and first rear patch surface S2 are selected to form the first optical patch when combined with each other, with optical power and astigmatism that match to the start-prescription values. First surfaces S1 and S2 are also selected for the first optical patch to meet the specification condition provided in step ST1. In accordance with the structure desired for the optical patches, the front surface S1 is of pseudo-spherical shape, and the rear surface S2 is the superposition of a pseudo-spherical base shape BS with a Fresnel structure FS. Any method known in the art may be used for this determination of the first front and rear patch surfaces S1 and S2.

One simple method for determining the first optical patch may consist in using a same pseudo-spherical shape for both the front surface S1 and the base shape BS of the rear surface S2 of the first optical patch. This shape may be spherical with a curvature radius which is preferentially close to that of the posterior surface of the ophthalmic element 2 intended to be used. With such patch design, the Fresnel structure FS is to produce alone the optical power value and astigmatism value of the start-prescription. Preferably, the start-prescription comprises the zero-value for astigmatism, which makes it easier to machine the rear mould insert 6 with the Fresnel structure FS. Indeed, the Fresnel surface portions may keep unchanged under rotations about the optical axis of the patch. Such start-prescription is indicated by START in FIGS. 3a and 3b.

Then in step ST3, optical test patches are determined respectively for the prescriptions contained in a start-segment which comprises the start-prescription START. An exemplary boundary for this start-segment is indicated with a bold rectangular frame within the prescription set as represented in FIG. 3a. The first rear patch surface determined for the start-prescription is used again for each one of the prescriptions within the start-segment. Then, a secondary front surface is calculated for each prescription of the start-segment, so that the optical test patch formed by pairing this secondary front patch surface with the first rear patch surface corresponds to the prescription. Such test patch is useless for the start-prescription itself, since the first optical patch has been already determined.

In step ST4, the specification condition is evaluated for each one of the optical test patches thus determined within the prescription start-segment. The prescriptions for which this specification condition is met constitute a primary prescription sub-segment which contains the start-prescription.

In step ST5, the primary prescription sub-segment is further limited to a secondary sub-segment contained in the primary one, and selected for covering all the prescriptions in the optical power and astigmatism plane with a tiling process. Within the two-dimensional display of FIG. 3b for the prescription set, the tiling process consists in selecting the secondary sub-segment to be used as a tile, and reproducing this tile by translating the pattern of the secondary sub-segment with several shift vectors, so that the translated patterns all together and with the secondary sub-segment cover the whole prescription set. It is possible that two among the translated patterns and the secondary sub-segment overlap, but preferably such occurrence is minimized or avoided by selecting properly the second sub-segment. In addition, the number of pattern translations to be implemented for covering the whole prescription set may be optimized, by selecting appropriately the number of prescriptions contained in the second sub-segment. As a result of the tiling process, the secondary sub-segment itself and each one of the translated patterns constitute respective prescription segments. Preferably, the secondary sub-segment also contains the start-prescription.

In FIG. 3a, the secondary prescription sub-segment is hatched. Because the secondary sub-segment extends over the whole set of astigmatism values in the example represented, this secondary sub-segment is limited by an upper boundary B1 and a lower boundary B2 when moving parallel to the optical power axis. In such case, the tiling requirement may be expressed into a requirement for the boundaries B1 and B2 to have a similar shape in the prescription plane. Put another way, the boundary B2 may be obtained by translating the boundary B1 with a shift vector constant and parallel to the optical power axis.

FIG. 3b is similar to FIG. 3a, but shows the complete tiling thus obtained over the whole prescription set. For illustrative purpose, the start-prescription corresponds to 0.25 diopter for the optical power, and zero astigmatism. Reference sign SG1 denotes the secondary sub-segment, and SG2 to SG13 denote the prescription segments obtained by translating the secondary sub-segment SG1 with shift vectors parallel to the optical power axis. In this implementation example, the shift vector for the segment SG6 is such that this segment SG6 partially overlaps the secondary sub-segment SG1. In addition, segments SG11, SG12 and SG13 are not complete, due to the shape of the overall limit of the prescription set. For economical matter, the prescriptions contained in the incomplete segments SG12 and SG13 may be excluded from the invention implementation. Put another way, the prescription set may be reduced to the union of segments SG2 to SG11 together with the secondary sub-segment SG1, also called prescription segment SG1.

The first front patch surface and the first rear patch surface, both labeled 1, are assigned definitely to the start-prescription START.

Then, within each prescription segment SG2 to SG11, one of the secondary front surfaces is assigned to each prescription in a manner that matches the prescription location within this segment, as compared with the segment SG1. This is indicated in FIG. 3b using numbers written in the left part of the respective boxes of the segments SG1 to SG3. These left-part located numbers identify the front patch surfaces. In the example represented, fifteen front patch surfaces different from each other are used. The first front surface, which is used for the start-prescription and numbered 1, is used again for the prescription with optical power equal to 1.00 diopter and zero-astigmatism, and also for the prescription with optical power equal to 1.75 diopter and zero-astigmatism, etc. Another example is the front patch surface labeled 8, which is used for prescriptions with optical power equal to 0.50 diopter, 1.25 diopters, 2.00 diopters, etc, with astigmatism each time equal to 0.50 diopter. The reader will understand himself how to go on with the assignment of the front patch surfaces within the other prescription segments SG4 to SG11, using the same assignment rule.

In particular, the first front patch surface labeled 1 is assigned in this manner to one prescription within each one of the segments SG1 to SG11, at constant locations with respect to the boundaries of the segments. These prescriptions are the start-prescription for the segment SG1, and so-called reference prescriptions for the other segments. These reference prescriptions are denoted REF in FIG. 3b. Then, in step ST6, a rear patch surface is calculated for each one of the reference prescriptions, so that the optical patch with this rear surface calculated and the first front surface produces an optical power and an astigmatism that match the values of the prescription.

Finally, in step ST7, front and rear surfaces are assigned to all prescriptions in the following manner:
the front surface is that already assigned and indicated by the number in the left part of the corresponding prescription box;
the first rear patch surface is also assigned to each one of the prescriptions within the segment SG1; and
the rear surface which has been calculated in step ST6 for the reference prescription of each one of the segments SG2 to SG11 is assigned to each one of the prescriptions of this segment.

Hence, one and same rear patch surface is dedicated to each prescription segment, and common to all prescriptions of this segment. In FIG. 3b, the rear patch surface for each prescription is indicated in the right part of the corresponding box. In addition, the same set of front patch surfaces is used for all the prescription segments.

One would notice that in the implementation of the invention which is illustrated by FIG. 3b, two optical patches correspond to each one of the prescriptions which are contained in the overlapping portions of the segments SG1 and SG6. For example, the prescription with optical power equal to 0.25 diopter and astigmatism equal to 0.50 diopter is produced by the optical patch having the front surface labeled 9 combined with the rear surface labeled 1, and also produced by the other optical patch having the front surface labeled 7 combined with the rear surface of the prescription segment SG6.

One would also note that the invention implementation described allows producing patches for a total prescription number of 158, with only 15 front mould inserts and 11 rear mould inserts.

The invention claimed is:

1. A method for determining a set of front patch surfaces and a set of rear patch surfaces for a series of optical patches each configured to provide optical power to a wearer of spectacles when the optical patch is combined with an eyeglass of the spectacles, the optical patch having a resiliency such that the front patch surface or the rear patch surface of said optical patch conforms to a shape of a posterior surface of the eyeglass,
    each optical patch being obtained by combining one of the front patch surfaces with one of the rear patch surfaces,
    each front patch surface being of pseudo-spherical shape, and each rear patch surface being comprised of a Fresnel structure superimposed on a pseudo-spherical base shape, pseudo-spherical surface denoting a continuous surface with curvature values existing at each point in the continuous surface,
    the series of optical patches containing at least one optical patch respectively for prescriptions each obtained by combining one optical power value out of a set of optical power values with one astigmatism value out of a set of astigmatism values,
the method comprising the following steps:
    1) providing at least one specification condition for the optical patches;
    2) for a start-prescription, determining one first rear patch surface and one first front patch surface so that an optical patch obtained by combining said first rear patch surface and said first front patch surface meets the specification condition;

3) for each prescription within a prescription start-segment containing the start-prescription, and other than said start-prescription, calculating a secondary front patch surface so that an optical test patch obtained by combining the first rear patch surface with the secondary front patch surface corresponds to said prescription;

4) selecting a primary prescription sub-segment within the prescription start-segment, so that all optical test patches obtained in step 3 and corresponding to prescriptions within said primary prescription sub-segment meet the specification condition;

5) selecting a secondary prescription sub-segment within the primary prescription sub-segment, so that all prescriptions are contained in at least one prescription segment produced by a tiling based on said secondary prescription sub-segment, with each prescription segment being obtained by translating the secondary prescription sub-segment used as a tile in a plane with optical power and astigmatism coordinates;

6) for each prescription segment produced by said tiling, and for the prescription which is at a location with respect to said prescription segment similar to that of the start-prescription within the secondary prescription sub-segment, determining a secondary rear patch surface with Fresnel structure so that another optical patch obtained by combining said secondary rear patch surface with the first front patch surface corresponds to the prescription; and 7) assigning a rear patch surface and a front patch surface to each prescription in the following manner:
   7a for the start-prescription, the first rear patch surface and the first front patch surface determined in step 2 is assigned
   when the prescription is within the secondary prescription sub-segment, and other than the start-prescription,
      the first rear patch surface determined in step 2 is assigned, and
      the secondary front patch surface calculated in step 3 for said prescription is assigned, and
   when the prescription is within a prescription segment produced by the tiling other than the secondary prescription sub-segment,
      the secondary rear patch surface determined in step 6 for said prescription segment is assigned, and
      the same front patch surface is assigned as the first front patch surface assigned in sub-step 7a or the secondary front patch surface assigned in sub-step 7b for the prescription within the secondary prescription sub-segment at the location similar to that of the current prescription with respect to the prescription segment.

2. The method according to claim 1, wherein the start-prescription comprises a first one of the optical power values and zero-astigmatism value, and
   the Fresnel structure of the first rear patch surface is selected so as to produce, alone, said first optical power value when a same shape is used for both the pseudo-spherical base shape of said first rear patch surface and the pseudo-spherical shape of the first front patch surface.

3. The method according to claim 2, further comprising the following step:

8) producing mold inserts with respective insert surfaces corresponding to one of the rear patch surfaces or the front patch surfaces as assigned to at least one prescription in step 7.

4. The method according to claim 2, wherein the specification condition provided in step 1 comprises at least one of a thickness of less than a first limit for an optical patch at a center point in said optical patch, a maximum thickness of less than a second limit for an optical patch along a peripheral edge of said optical patch, an optical-type condition for an optical patch, and a minimum number of prescriptions for which an aspherization of the rear patch surface is correct.

5. The method according to claim 4, wherein the specification condition provided in step 1 comprises at least one of a thickness of less than 2 mm for the optical patch at the center point, and a maximum thickness of less than 3 mm for the optical patch along the peripheral edge.

6. The method according to claim 1, further comprising the following step:

8) producing mold inserts with respective insert surfaces corresponding to one of the rear patch surfaces or front patch surfaces as assigned to at least one prescription in step 7.

7. The method according to claim 6, wherein the specification condition provided in step 1 comprises at least one of a thickness of less than a first limit for an optical patch at a center point in said optical patch, a maximum thickness of less than a second limit for an optical patch along a peripheral edge of said optical patch, an optical-type condition for an optical patch, and a minimum number of prescriptions for which an aspherization of the rear patch surface is correct.

8. The method according to claim 7, wherein the specification condition provided in step 1 comprises at least one of a thickness of less than 2 mm for the optical patch at the center point, and a maximum thickness of less than 3 mm for the optical patch along the peripheral edge.

9. The method according to claim 1, wherein the specification condition provided in step 1 comprises at least one of a thickness of less than a first limit for an optical patch at a center point in said optical patch, a maximum thickness of less than a second limit for an optical patch along a peripheral edge of said optical patch, an optical-type condition for an optical patch, and a minimum number of prescriptions for which an aspherization of the rear patch surface is correct.

10. The method according to claim 9, wherein the specification condition provided in step /1/ comprises at least one of a thickness of less than 2 mm for the optical patch at the center point, and a maximum thickness of less than 3 mm for the optical patch along the peripheral edge (E).

11. The method according to claim 1, wherein the shape of each front patch surface (S1) is either spherical or toric.

12. The method according to claim 1, wherein the pseudo-spherical base shape of each rear patch surface is either spherical or toric.

13. The method according to claim 12, wherein the pseudo-spherical base shape of each rear patch surface is spherical.

14. The method according to claim 1, wherein the optical power values of the optical power value set have a constant increment of 0.25 diopter.

15. The method according to claim 1, wherein the astigmatism values of the astigmatism value set have a constant increment of 0.25 diopter.

16. The method according to claim 1, wherein the secondary prescription sub-segment used as a tile contains less than twenty prescriptions different from each other.

17. The method according to claim 1, wherein the set of optical power values contains at least twenty-five power values, and the set of astigmatism values contains at least four values, and the method results in less than fifteen rear patch surfaces different from each other, and less than twenty front patch surfaces different from each other.

18. The method according to claim 1, wherein each front patch surface assigned in step 7 is convex so that each optical patch is configured to be applied onto a posterior surface of an ophthalmic element, said posterior surface facing a wearer's eye in use position, with the front patch surface of the optical patch facing the posterior surface of the ophthalmic element.

19. The method according to claim 1, wherein the pseudo-spherical base shape of each rear patch surface assigned in step 7 is convex so that each optical patch is configured to be applied onto a posterior surface of an ophthalmic element, said posterior surface facing a wearer's eye in use position, with the rear patch surface of the optical patch facing the posterior surface of the ophthalmic element.

\* \* \* \* \*